United States Patent [19]

Wohl

[11] 4,137,890

[45] Feb. 6, 1979

[54] TOROID SWEEP ENGINE

[76] Inventor: Stephen M. Wohl, P.O. Box 117, Lachine, Quebec, Canada, H8S 4A5

[21] Appl. No.: 427,324

[22] Filed: Dec. 21, 1973

[51] Int. Cl.² .............................................. F02B 53/04
[52] U.S. Cl. .................................. 123/205; 123/248; 418/232
[58] Field of Search ............... 123/8.49, 8.45, 8.05, 123/8.09; 418/244, 245, 243, 246, 86, 232

[56] References Cited

U.S. PATENT DOCUMENTS

| | | | |
|---|---|---|---|
| 714,583 | 11/1902 | Johnson | 418/245 X |
| 903,864 | 11/1908 | Johnson | 123/8.49 |
| 1,145,627 | 7/1915 | Stradovsky | 123/8.05 |
| 1,261,128 | 4/1918 | Higgins | 418/245 |
| 2,170,414 | 8/1939 | Jutting | 123/8.05 |
| 2,760,466 | 8/1956 | Black | 123/8.09 |
| 2,944,533 | 7/1960 | Park | 123/8.49 |
| 3,771,500 | 11/1973 | Shakiba | 123/8.09 |

*Primary Examiner*—Clarence R. Gordon

[57] ABSTRACT

The Toroid Sweep Engine with Reciprocating Jut generates power within a toroidal-shaped chamber whose walls are divided into two ring-like sections which are free to rotate relative to one another around the toroid axis. An obstacle juts from each of the wall sections into the chamber. Fresh air is pumped at high pressure and high temperature into a region of the chamber between the two obstacles, and fuel is then injected into and burned in this region. The products of combustion force the obstacles apart, turning a wall section, and when the obstacles eventually meet after circumnavigation of the toroid, one of them withdraws from the chamber allowing the obstacles to pass. More fresh air and fuel are introduced between the again separating obstacles following the rendezvous, while spent gases from the previous burning are swept and squeezed out an exhaust duct leading from that volume within the chamber which is compressed between the obstacles. The long period of combustion, the uniform rate at which driving gases expand, and the virtually complete positive scavenging in the Toroid Sweep Engine give prospect of extremely efficient and clean fuel consumption.

12 Claims, 27 Drawing Figures

TOROID SWEEP ENGINE

This invention relates to an internal combustion engine which generates power.

Power is commonly generated by engines in which pistons move with a translative reciprocating motion within right-circular cylinders. An inherent disadvantage of such engines is the need to continually accelerate the pistons and other engine members to which they connect, this acceleration requiring an expenditure of energy and resulting in a reduction of power output. The fact that one out of every two, or three out of every four strokes of reciprocating pistons do not yield power limits the rate at which work can be produced in a given sized reciprocating engine. Theoretically optimal power can be derived in an internal combustion engine only if the driving gases maintain a pressure minutely greater than the pressure necessary to do work, but since reciprocating pistons generally travel at very non-constant speeds, they make it virtually impossible to maintain such pressures. Evacuation of spent gases is generally far from complete in reciprocating engines, and where scavenging is executed by a mixture of fresh air and fuel, some fuel is often wasted. A resolution of several of the reciprocating engine's problems has been attempted with the "Wankel" rotary engine, but that machine has disadvantages of its own: the force which exploded gases exert against the quasi-triangular rotor does not give rise to torque exclusively in the direction of rotation, but only predominantly in that direction; some power is lost in oscillating the rotor around the central axis; and the evacuation of spent gases is quite incomplete.

The engine I have invented is truly rotary. Power is generated within a toroidal-shaped chamber, with one ring-like section of the walls of the chamber rotating with respect to the remaining walls of the chamber, rotation being around the axis of the toroid. Push is provided by entrapping driving gases between two obstacles within the toroidal chamber, one obstacle being supported by one section of the walls, and the other obstacle being mounted within the other section of the walls in such a way that it can withdraw temporarily from the toroid when the two obstacles have made a complete revolution relative to one another and begin rendezvous — that is, the second obstacle lets the first obstacle pass by. Live, expanding gases maintain their push against the back side of the revolving obstacle through most of its revolution, while the front side of this revolving obstacle sweeps and positively evacuates virtually all the gases spent in the previous revolution. My engine is the essence of simplicity, its core comprised of as few as two moving parts: a retractable obstacle, called the jut, and the component that carries the revolving obstacle, called the rotor. The engine delivers power during the major part of each revolution, not merely during less than half of each revolution as in two-stroke reciprocating engines, or less than one quarter of each revolution as in four-stroke reciprocating engines. Because the driven surface of my engine, namely the back side of the obstacle carried by the rotor, moves at uniform speed and the volume containing the live gases increases at a uniform rate, working pressures can better approximate ideal pressures and power output can be brought much closer to the theoretical limit than has previously been possible. Because fuel in the toroidal chamber burns for a longer period, combustion is far more complete and efficient than in existing engines, and emission pollutants are minimized.

In drawings which illustrate an embodiment of the invention.

In drawings which illustrate various embodiments of the invention.

Figure 14:
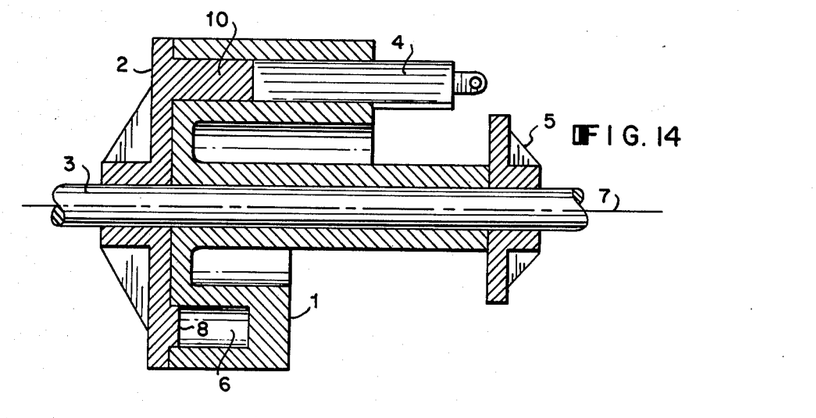
FIG. 14 is a right side elevation view of the assembled engine of which the engine block of FIG. 1 is a component.

The assembled engine shown in FIG. 14 comprises a stationary member called the engine block, 1, a rotating member called the rotor 2, a rotating member called the drive shaft 3, a sliding member called the jut 4, and a rotating member called the dam wheel 5. Within the engine is a chamber 6 shaped in the form of a toroid. The internal surfaces of the walls of this toroidal chamber 6 are coincident with the surface of revolution generated by revolving a rectangle around a line external to the rectangle and parallel with two of the rectangle's sides. The line about which revolution of the rectangle takes place is called the toroid axis 7, and is coincident with the axis of the rotor, the axis of the engine block, the axis of the jut, the axis of the drive shaft, and the axis of the cam wheel.

Three of the four surfaces of the toroidal chamber 6 are surfaces of the engine block 1. The fourth surface 8 rotates around the toroid axis 7 when the engine is in operation, and forms a surface of the engine component called the rotor 2. The embodiment of the invention shown in FIG. 14 has the rotating surface 8 being one of the chamber surfaces perpendicular to the toroid axis, but other embodiments can have one of the cylindrical surfaces of the toroidal chamber rotate as a surface of the rotor, with the remaining three surfaces forming surfaces of the engine block.

Figures 5, 6, 9:
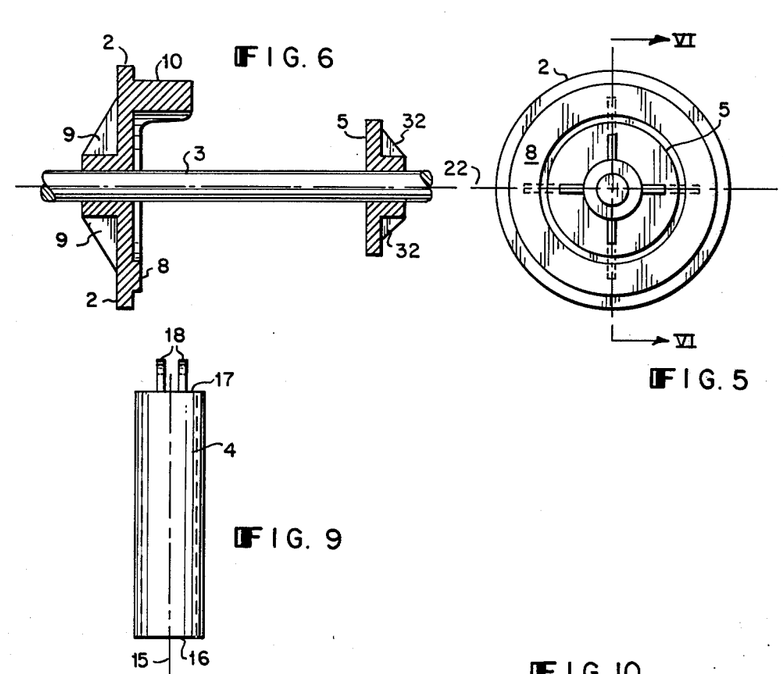
FIG. 5 is an elevation of the rotor which mates with the engine block of FIG. 1, the rotor being shown carrying a drive shaft and a cam wheel.
FIG. 6 is a right side elevation view of this rotor and drive shaft and cam wheel, drawn as a section of the line VI—VI of FIG. 5.
FIG. 9 is a top plan view of this jut.
Figure 7:
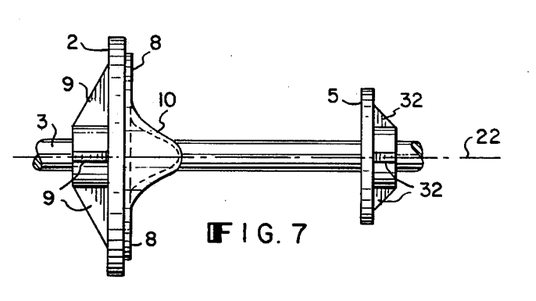
FIG. 7 is a top plan view of this rotor and drive shaft and cam wheel.

The rotor 2 of FIGS. 5, 6, and 7 is the rotor of the embodiment of the invention shown in FIG. 14. Surface 8 of the rotor is a plane surface perpendicular to the rotor axis 22. Surface 8 is bounded by two concentric circles that lie within the surface 8 and that are separated by a distance equal to the distance between the cylindric surfaces of toroidal chamber 6. Surface 8 is held in a fixed orientation relative to the rotor axis 22 with the help of supporting ribs 9.

Affixed to surface 8 is a rigid projection called the sweeper 10. The sweeper extends away from surface 8, in the direction along the length of rotor axis 22, for a distance equal to the distance between the plane walls of the toroidal chamber 6. The sweeper 10 fits entirely into the toroidal chamber 6 when the rotor 2 mates with the engine block 1, and the thickness of the sweeper, in directions radial to the rotor axis 22, is such that when the rotor is mated with the engine block, every circle contained within the toroid is interupted by the sweeper.

Figure 8:
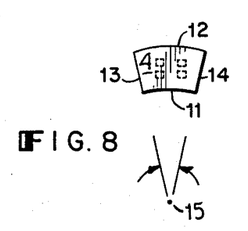
FIG. 8 is an elevation of the reciprocating jut which is mounted within the engine block of FIG. 1.
Figure 10:
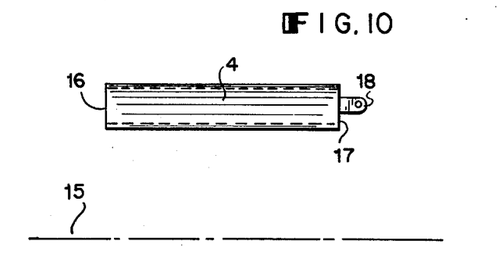
FIG. 10 is a right side view of this jut.

The jut 4 of FIGS. 8, 9, and 10 is the jut shown in FIG. 14. Two surface 11 and 12 of the jut are concentric right-circular cylindrical surfaces, with the distance between the surfaces 11 and 12 equalling the distance between the cylindrical surfaces of toroidal chamber 6. The axis of cylindrical surfaces 11 and 12 is called the jut axis 15. Two other surfaces of the jut, called the back surface 13 and the front surface 14, are plane surfaces with each of the planes passing through the jut axis 15 and with the angle between the planes, W, being a small angle. The remaining two surfaces of the jut, called the butting surface 16 and the surface 17, are plane surfaces perpendicular to the jut axis 15, with the distance between surfaces 16 and 17 being greater than the distance between the plane surfaces of the toroidal chamber 6. Affixed to surface 17 are two small extensions 18 which permit a linkage to be connected to the jut.

The engine block 1 of FIGS. 1, 2, 3, and 4 is the engine block of the embodiment of the invention shown in FIG. 14. The engine block has three principal cavities. The walls of the first principal cavity, cavity 19, form three of the four walls of the toroidal chamber 6. Two of the three surfaces of cavity 19 are concentric right-circular cylinders with the axis of the cylinders being called the engine block axis 20, and the third surface of cavity 19 is a plane surface perpendicular to the engine block axis.

The second principal cavity of engine block 1, called cavity 21, is a right-circular cylindrical hole equal in diameter to the diameter of the drive shaft 3. The axis of cavity 21 is coincident with the engine block axis 20.

The third principal cavity of engine block 1, called jut cavity 23, is joined to toroidal cavity 19 and is designed to house the jut 4. The internal dimensions of jut cavity 23 in directions perpendicular to the direction of engine block axis 20, correspond and are equal to the external dimensions of jut 4 in directions perpendicular to the direction of jut axis 15. Jut cavity 23 is positioned in the engine block 1 so that the axis of the cavity coincides with engine block axis 20.

Engine block 1 also contains a duct 24 to convey exhaust gases. Duct 24 is connected to toroidal cavity 19 at an exhaust port, 25. Exhaust port 25 is located a small number of degrees to one side of the jut cavity 23, and exhaust port 25 does not intersect any plane that both contains engine block axis 20 and intersects jut cavity 23.

Engine block 1 contains a duct 26 to convey fresh air. Duct 26 is connected to toroidal cavity 19 at an inlet port, 27. Inlet port 27 is located a small number of degrees to the side of jut cavity 23 opposite the side on which exhaust port 25 is located. Inlet port 27 does not intersect any plane that both contains engine block axis 20 and intersects jut cavity 23.

Engine block 1 contains a hole 28 through which a fuel injector is enabled to admit fuel to the toroidal cavity 19. Hole 28 enters the toroidal cavity 19 at a break in a surface of the toroidal cavity 19, the position of the break being a small number of degrees to one side of the jut cavity 23, on the same side as inlet port 27. The break in a surface of toroidal cavity 19 which accommodates hole 28 does not intersect any plane that both contains engine block axis 20 and intersects jut cavity 23.

Engine block 1 is shown strengthened with three structural ribs: an upper rib, 29, and two lower ribs, 30.

The cam wheel 5 of FIGS. 5, 6, and 7 is the cam wheel in the embodiment of the invention shown in FIG. 14. The cam wheel 5 is basically a disc whose axis is concentric with the axis of a right-circular cylindric hole through the disc, the inside diameter of the hole being equal to the outside diameter of the drive shaft 3. The cam wheel is strengthened by structural ribs, 32. Cam surfaces are built onto and/or into a plane surface or the plane surfaces of the cam wheel; and/or cam surfaces are built onto and/or into the cylindrical surface of the cam wheel.

When the engine is assembled, as in FIG. 14, the rotor 2 with the drive shaft 3 rigidly secured to it is mated with the engine block 1 so that the sweeper 10 fits into the toroidal cavity 19 and contacts the plane surface of the toroidal cavity 19. In the assembled configuration the drive shaft 3 is supported by and extends clear through the engine block 1. The jut 4 is slid into the jut cavity 23. Adjacent to the back side 31 of the engine block 1, the cam wheel is mounted around and rigidly secured to a portion of the drive shaft 3 which projects from the engine block 1. There then exists coincidence between the cam wheel axis, the drive shaft axis, the rotor axis 22, the engine block axis 20, the jut axis 15, and the axis 7 of the toroidal chamber 6 formed by the three walls of the engine block toroidal cavity 19 and the surface 8 of rotor 2.

Figure 11:
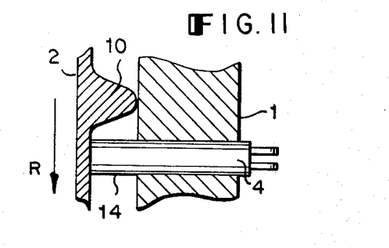
FIGS. 11, 12, and 13 are schematic top plan views of an internal portion of the assembled engine of which the engine block of FIG. 1 is a component.
Figure 12:
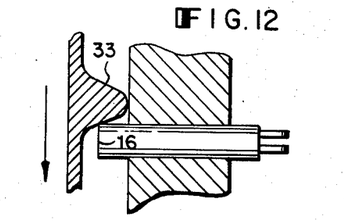
Figure 13:
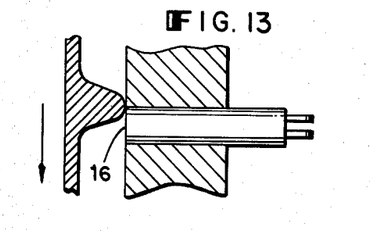
Figure 15:
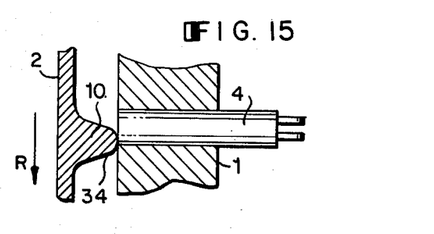
FIGS. 15, 16, and 17 are schematic top plan views of an internal portion of the assembled engine of which the engine block of FIG. 1 is a component.
Figure 16:
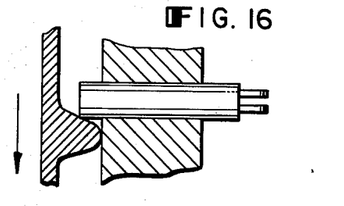
Figure 17:
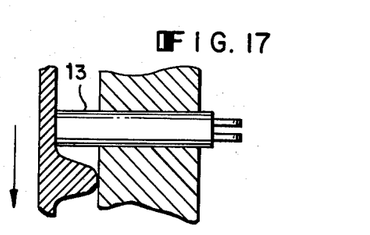

The rotor 2, carrying the sweeper 10, turns relative to the engine block 1, housing the jut 4, in the direction indicated by arrows R. FIGS. 11, 12, and 13 are schematic top plan views showing the sweeper 10 approaching the jut 4; FIG. 14 is a right side elevation view showing the sweeper 10 passing across the butting surface 16 of the jut 4; and FIGS. 15, 16, and 17 are schematic top plan views showing the sweeper 10 leaving the jut 4. The side of the sweeper 10 which is the first to approach the jut 4 during rotation is called the front side 34 of the sweeper; the side of sweeper 10 which is the last to leave jut 4 during rotation is called the back side 33 of the sweeper.

When the sweeper 10 leaves the jut 4 at the start of a power cycle, as in FIG. 17, the butting surface 16 of the jut comes into and maintains contact with surface 8 of the rotor. An inlet valve controls flow through the inlet port 27 opens and fresh air is forced from the inlet duct 26 into the small region of the toroidal chamber 6 lying between the front side 14 of the jut and the back side 33 of the sweeper. Air induction is executed at high pressure and concomitant high temperature by an air pump or air blower powered from the drive shaft 3 or the rotor 2. After the rotor has advanced a few degrees in the direction R and a pre-determined weight of air has been admitted, the inlet valve closes obstructing flow through the inlet port 27 and a fuel injector begins injecting fuel through hole 28 into the hot, high-pressure air charge contained between the front side 14 of the jut and the back side 33 of the sweeper. The temperature of the air charge is sufficient to ignite the fuel, and the gases created by the ensuing combustion exert very high pressure against the back side of the sweeper. The push against the sweeper forces the sweeper to move away from the jut, and therefore forces the rotor to turn relative to the engine block. The volume contained within the toroidal chamber between the front side of the jut and the back side of the sweeper increases linearly with time if rotational speed of the rotor is constant. The injector continues to inject fuel as the sweeper moves away, delivering fuel at a rate calculated to maintain a relatively constant pressure behind the sweeper which pressure is only slightly greater than the pressure theoretically necessary to do the desired work at the desired rate of speed.

After the sweeper 10 has nearly completed a revolution and begins to approach the jut 4, the injector stops injecting. When the front side 34 of the sweeper is nearly touching the back side 13 of the jut, as in FIG. 11, the jut begins to withdraw from the toroidal chamber 6 in a translative motion parallel with the toroid axis 7, so that just as the front side 34 of the sweeper is about to clear the plane of the back side 13 of the jut, as in FIG. 13, the butting surface 16 of the jut comes into and rests at the plane surface of toroidal cavity 19 of the engine block 1. The sweeper 10 then passes over and maintains contact with the butting surface 16, and when the back side 33 of the sweeper is about to enter the plane of the front side 14 of the jut, as in FIG. 15, the jut begins to extend back into the toroidal chamber so that the butting surface 16 again comes into contact with surface 8 of the rotor 2 just as the last of the back surface 33 of the sweeper passes through the plane of the front surface 14 of the jut. The inlet valve then opens, and enough fresh air is forcibly inducted through the inlet port 27 into the small but growing space between the back side 33 of the sweeper and the front side 14 of the jut to sustain the combustion of all the fuel which is to be injected into the toroidal chamber during the upcoming revolution. After the sweeper has advanced a few degrees and the inlet valve has closed, the injector again begins injecting fuel at a controlled rate into the space between the back side 33 of the sweeper and the front side 14 of the jut; the fuel ignites due to the high temperature of the compressed air; and the gaseous products of combustion again exert force against the back side 33 of the sweeper, delivering torque and power to the drive shaft.

As the sweeper is pushed from behind and revolves around the circumference of the toroidal chamber, the front side 34 of the sweeper sweeps and drives ahead of it gases which occupy the toroidal chamber as a result of having been spent during the previous power cycle. The exhaust port 25 adjacent to the back side 13 of the jut 4 remains open at all times. Therefore the spent gases ahead of the sweeper are continually and smoothly evacuated into the exhaust duct 24. Scavenging is positive and virtually total, and reverse exhaust pressure on the sweeper is virtually nil. The complete separation of the powering phenomena behind the sweeper and the evacuation phenomena in front of the sweeper assures that no unspent fuel is wasted and lost out the exhaust.

After the sweeper 10 passes the exhaust port 25 and the jut 4 again temporarily withdraws to allow the sweeper by, all functions described above repeat themselves cyclically, with power being delivered to the drive shaft 3 during a major portion of each revolution.

The closer the contact between the sweeper 10 and the jut 4, the more complete the elimination of spent gases at the end of each cycle. The sweeper can be contoured so that its front and back sides closely follow the jut during the jut's reciprocating motion. If this is to be done, then the front surface 34 and the back surface 33 of the sweeper are comprised exclusively of elements which are segments of straight lines, these segments being such that the lines of which they are part all pass through the axis 22 of the rotor 2 at right angles. Contours of the sweeper's front and back surfaces perpendicular to the straight-line segments are set as functions of the particular kind of motion adhered to by the jut. The front surface 34 of the sweeper is contoured so that during the jut's withdrawal from the toroidal chamber 6, the corner of the jut formed by the intersection of the back surface 13 of the jut and the butting surface 16 of the jut stays within a very small distance of some element — different elements in succession — of the front surface 34 of the sweeper. And the back surface 33 of the sweeper is contoured so that during the jut's extension into the toroidal chamber 6, the corner of the jut formed by the intersection of the jut's front surface 14 and the jut's butting surface 16 stays within a very small distance of some element — different elements in succession — of the back surface 33 of the sweeper.

Thus, if the motion of withdrawal of the jut and the motion of extension of the jut are simple harmonic, then both the front surface 34 of the sweeper and the back surface 33 of the sweeper can be given basically sinosoidal contours to allow them to very closely follow the jut, with each sinosoid being one half a wave and tangent to surface 8 of the rotor 2.

The motion of the jut 4, the motion of the inlet valve, and the action of the fuel injector of the embodiment of the invention illustrated in FIGS. 1 through 17, are all activated by cam surfaces on and/or in the cam wheel 5, through the intervention of cam followers, mechanical linkages, and/or hydraulic mechanisms. Other embodiments of the invention utilize the rotor 2 itself as a cam wheel, with cam surfaces — built onto and/or into the rotor — performing one or more of the above-mentioned functions via the intervention of cam followers, mechanical linkages, and/or hydraulic mechanisms.

The embodiment of the invention illustrated in FIGS. 1 through 17 may be modified, yielding different embodiments of the invention, if the jut 4 is positioned within the engine block 1 in such a way that it enters the toroidal chamber 6 through one of the cylindrical surfaces of the toroidal cavity 19; and/or if the exhaust port 25 and/or the inlet port 27 enters the toroidal chamber 6 through either the plane surface of the toroidal cavity 19 or the inner cylindrical surface of the toroidal cavity 19; and/or if the injector hole 28 enters the toroidal chamber 6 through either of the cylindrical surfaces of the toroidal cavity 19.

The toroidal chamber 6, in other embodiments of the invention, need not necessarily conform with the surface generated by revolving a rectangle around a line, as in the illustrated embodiment, but rather may conform with the toroid generated by revolving any closed plane figure around a straight line which lies in the plane of the figure and is external to the figure. The shapes of the jut and the sweeper would then have to be adjusted accordingly.

At the start of operation of the engine I have invented, an embodiment of which is depicted in FIGS. 1 through 17, temperature of the fresh air charge in the toroidal chamber 6 at the end of the initial induction phase may be too low to readily ignite the fuel which the injector begins to inject, and charge temperature in the chamber may not reach sufficient levels until the air pump or air blower are brought to full operating speed. Methods of overcoming the problem include (i) introducing the live tip of a spark plug through a wall of the engine block 1 into a recess in a surface of the toroidal chamber 6 near the entrance hole 28 of the fuel injector and, as the engine is turned over by external power, jumping sparks across the plug gap until ignition of injected fuel takes place; (ii) introducing a small electrical filament through a wall of the engine block 1 into a recess in a surface of the toroidal chamber 6 near the entrance hole 28 of the fuel injector and, as the engine is turned over by external power, heating the filament until the air charge in its vicinity reaches sufficient temperature to ignite injected fuel and/or until ignition of injected fuel takes place on the surface of the filament; (iii) introducing a small electrical filament through a wall of the engine block 1 into the inlet duct 26 and, as the engine is turned over by external power, having the filament heat fresh air passing through the duct until ignition of fuel takes place in toroidal chamber 6; (iiii) briefly diverting the inlet duct 26 from connection with the air pump or air blower, and at the same time connecting the inlet duct with a reservoir of high-pressure air until ignition of fuel takes place in the toroidal chamber 6, diversion from and re-connection of the duct with the pump or blower being achieved by manual or engine switching of a diversion valve; (iiiii) temporarily disengaging the air pump or air blower from its connection with the drive shaft 3 or the rotor 2 and driving the air pump or air blower by external power until air in the inlet duct 26 reaches high pressure and temperature, and at such time briefly applying external power to turn the drive shaft or rotor, disengaging the air pump or air blower from its independent direct coupling with external power, and re-connecting the air pump or air blower with the drive shaft or rotor. The various methods of assisting the engine to start may be employed singly or in combination.

Figures 18, 19, 20:
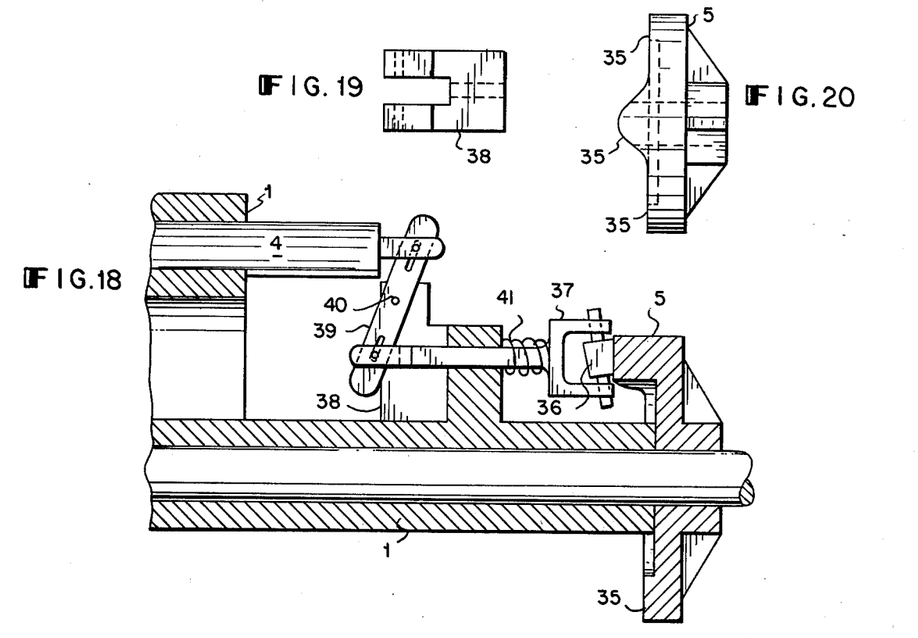
FIG. 18 is a right side elevation view of the back portion of an assembled engine.
FIG. 19 is a top plan view of the element in FIG. 18 which supports a cam follower and a rocker-arm pivot.
FIG. 20 is a top plan view of the cam wheel which is incorporated in the engine of FIG. 18.

The embodiment of the invention illustrated in FIG. 18 manifests one of the means whereby the jut, 4, of FIG. 14 may be activated by the cam wheel, 5, of FIG. 14. A cam surface, 35, is fashioned around the rim of cam wheel 5 of FIGS. 18 and 20. A conical roller, 36, maintains contact with cam surface 35, and is carried by a cam follower, 37. Cam follower 37 slides back and forth within a support, 38, illustrated in FIGS. 18 and 19, which support is rigidly affixed to the engine block, 1. The cam follower 37 alternately pushes and pulls one end of a rocker arm, 39. The rocker arm 39 is supported by a pivot, 40, which pivot is affixed to the same element, 38, which supports the cam follower 37. That end of rocker arm 39 which is not linked to the cam follower 37, is linked to the jut 4. The reciprocating translative motions of jut 4 and cam follower 37 are in opposite directions along parallel lines. A spring, 41, returns the cam follower 37 and the jut 4 to their neutral positions after each rendezvous between conical roller 36 and the modulation in the cam surface 35.

Figure 21:
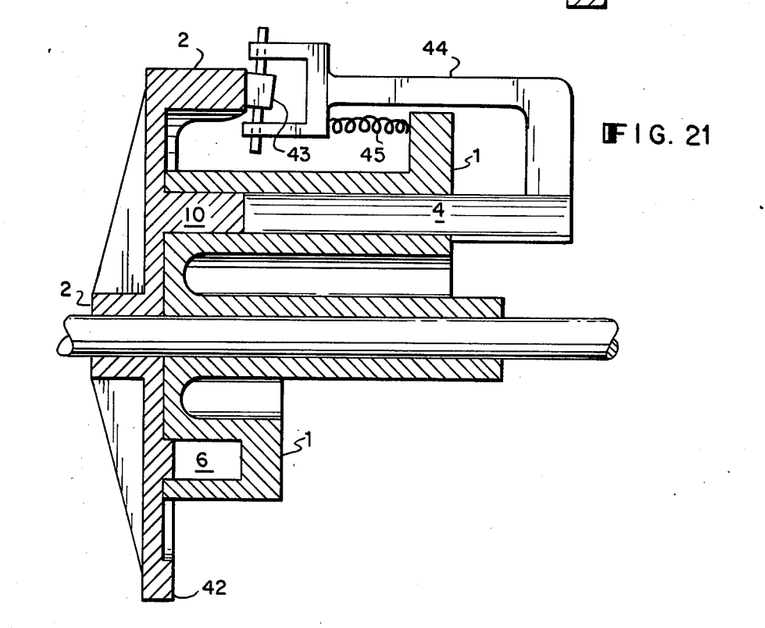
FIG. 21 is a right side elevation view of another assembled engine.

The embodiment of the invention illustrated in FIG. 21 manifests one of the means whereby a jut, 4, may be activated by a rotor, 2. A cam surface, 42, is fashioned around the rim of rotor 2. A modulation in cam surface 42 is shown contacting a conical roller, 43, as sweeper 10 passes jut. The conical roller 43 maintains contact with cam surface 42, and is carried by a cam follower, 44. Cam follower 44 is rigidly affixed to jut 4, and alternately pushes jut 4 out of toroidal chamber 6, then pulls jut 4 back into toroidal chamber 6. A spring, 45, returns the cam follower 44 and the jut 4 to their neutral positions after each rendezvous between conical roller 43 and the modulation in cam surface 42.

Fresh air and injected fuel must be introduced into the enlarging region of the toroidal chamber lying between the sweeper and the jut as the sweeper and the jut depart from one another, and spent gases must be evacuated from the toroidal chamber from the diminishing region lying between the sweeper and the jut as the sweeper and the jut approach one another. A duct for conveying fresh air and a hole for accommodating a fuel injector can therefore connect with the chamber from points on any section of the chamber walls so long as this inlet duct and this injector hole open into the enlarging chamber region during departure of the sweeper and the jut; and a duct for conveying spent gases can therefore connect with the chamber from points on any section of the chamber walls so long as this exhaust duct opens into the diminishing chamber region during approach of the sweeper and the jut.

Figure 22:
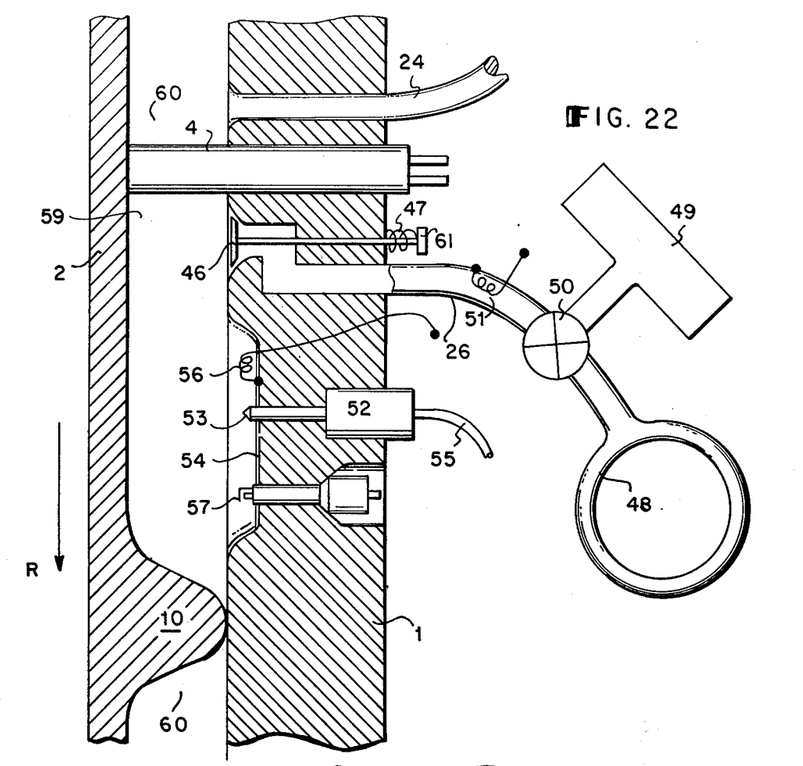
FIG. 22 is a schematic top plan view of the air input, fuel input, ignition, and exhaust systems of an assembled engine.

FIG. 22 is a schematic diagram of the means by which air induction, fuel injection, ignition, and waste evacuation occur within the toroidal combustion chambers of various embodiments of my engine. The sweeper 10 on the rotor 2 is shown in a position it occupies immediately after rendezvous with jut 4. Sweeper 10 and rotor 2 move in direction R relative to engine block 1 and jut 4. An inlet valve 46 is shown in its open position at the junction between the air inlet duct 26 and the enlarging portion, 59, of the toroidal chamber. Valve 46 opens very soon after sweeper 10 passes the valve. The tappet 61 of valve 46, at the end of the stem away from the inlet port, may be pushed, to slide the valve into the open position, by a cam follower such as cam follower 37 in FIG. 18, operating off a cam surface on cam wheel 5. An air pump 48 in FIG. 22 forces air at high pressure and concomitant high temperature through the inlet duct 26, past the head of valve 46, and into the chamber. After sweeper 10 has revolved through a small fraction of a complete revolution and sufficient fresh air has been inducted, inlet valve 46 closes under the action of spring 47. Fuel injector 52 then begins injecting fuel into the increasing portion, 59, of the toroidal chamber. The injecting tip 53 of the fuel injector is kept clear of sweeper 10 by being located within a recess 54 that is carved into the section of the chamber walls that is incorporated in the engine block 1. Fuel line 55 feeds fuel to injector 52. The injector may be of the plunger type, with the plunger pushed and pulled by a cam follower such as cam follower 37 of FIG. 18, which is activated by a cam surface on cam wheel 5.

The fuel injected into chamber space 59 burns as soon as it contacts the hot previously inducted compressed air. Injector 52 stops injecting when sweeper 10, after turning through the major part of a revolution, returns to and comes close to touching jut 4. Jut 4 retracts from the chamber to let sweeper 10 pass by, jut 4 returns into the chamber, inlet valve 46 opens once again, and a new cycle begins. As sweeper 10 turns through another revolution, gases expended during the previous cycle are swept from the diminishing portion, 60, of the toroidal chamber, out through exhaust duct 24.

If the air forcibly inducted into the chamber is not hot enough to cause self-ignition of injected fuel, then electric heating filaments and/or a spark plug may be employed as illustrated in FIG. 22. An electric heating filament, 51, may be placed in the air inlet duct 26 to warm the pumped air on its way to the chamber; and/or an electric heating filament 56 may be placed in a recess 54 in the chamber walls with an orientation such as to permit injected fuel to contact and ignite on the filament surface; and/or a spark plug 57 may be introduced to the chamber with its tip in a recess 54 in the vicinity of fuel injector tip 53, the spark plug tip carrying an electric spark when fuel begins entering the chamber.

Air pump 48 can be powered from the drive shaft to which rotor 2 is mated. The engine drive shaft can be incorporated into the pump as the pump's power delivery shaft.

A diversion valve 50 is shown situated on the flow path from air pump 48 to the toroidal chamber. During operation of the engine, pump 48 feeds not only the chamber, but also feeds a compressed-air reservoir, 49, through a branch duct leading off from the diversion valve 50. Before the engine is shut off, diversion valve 50 is turned so as to seal off reservoir 49 from both the chamber and the pump 48. The compressed air stored within reservoir 49 is then used to start or help start the engine: the diversion valve 50, at the start of operation, is turned to a position in which it (1) connects reservoir 49 with the chamber and (2) obstructs the feed of pump 48 to both the reservoir 49 and the chamber. As soon as the engine is running and the air pump has built up a sufficient pressure head, the diversion valve 50 is turned to a position in which the chamber, the pump 48, and the reservoir 49 are all connected.

Figure 23:
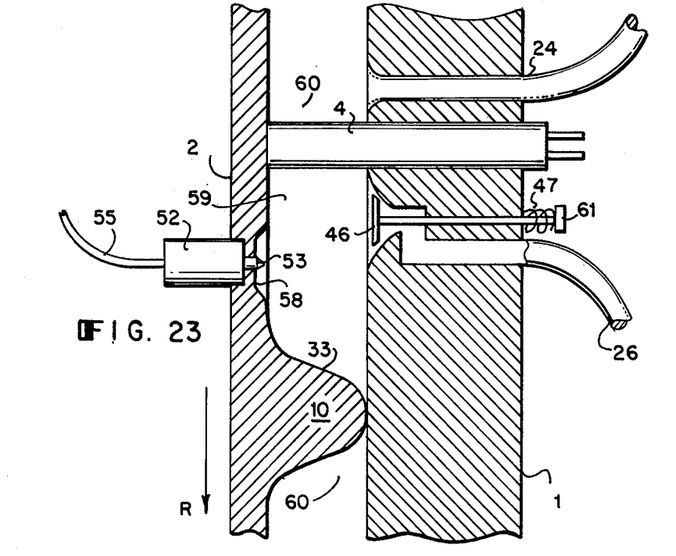
FIG. 23 is a schematic top plan view of the air input, fuel input, and exhaust systems of an assembled engine.

In the embodiment of the engine illustrated by FIG. 23, air induction and waste elimination are accomplished in the same manner as in the FIG. 22 embodiments. Fuel induction, however, is via a fuel injector 52 which is mounted in the rotor 2 adjacent to the trailing side 33 of sweeper 10. To prevent its interference with jut 4, the injecting tip 53 of injector 52 is recessed within a hollow, 58, carved into the section of the chamber walls that is incorporated into the rotor 2. Fuel line 55, that feeds injector 52, may draw fuel through a channel drilled within the drive shaft to which rotor 2 is attached. The injector 52 may be of the plunger type, with the plunger behaving like a cam follower by virtue of contact between an extension of the plunger and a cam surface fashioned around the perimeter of the engine block 1 outside of the toroidal chamber. The ordering of the air induction, fuel injection, and waste evacuation phenomena is the same in the FIG. 22 and FIG. 23 embodiments.

A group of engines which are embodiments of my invention can be integrated to form a single multi-chamber engine, by having all engines of the group incorporate the same drive shaft. The multi-chamber engine is itself an embodiment of the invention. The rotor of one engine of an integrated group can serve as the cam wheel of another. If individual engines are oriented so that two rotors face one another, then the two rotors can be fashioned as a single rotor; if two cam wheels face one another, then the two cam wheels can be fashioned as a single cam wheel; if distinct cam wheels are not used and two engine blocks face one another, then the two engine blocks can be fashioned as a single engine block and the opposed rotors can serve as cam wheels. Angular position of the juts within individual chambers of a multi-chamber engine can be staggered so that power delivery to the drive shaft is smooth and never interrupted.

The Toroid Sweep Engine may be used to power automobiles, aircraft, boats, or any other self-propelled vehicles, and may be used to drive electric generators, power tools, or any kind of machinery.

Since rotation of one section of the walls of the toroidal chamber of my engine is defined in terms of angular displacement relative to the remaining section of the walls of the chamber, the designation of the two respective sections as "rotatory" or "stationary" depends merely on the arbitrary setting of a base of observation upon one of the sections. The two wall sections are essentially homologous, and all functions associated with either one of them — such as housing of a fuel injector or housing of a jut or housing of a fluid duct — can just as well be associated with the other. The very terms "rotatory" and "stationary" are not absolute: the engine block incorporates the section of the chamber walls labeled "stationary", but that "stationary" section, and thus the engine block, may be in motion relative to, for instance, the earth or the body of a vehicle which the engine is powering.

To enable the sweeper and the jut to pass one another, the jut can be withdrawn entirely from the chamber at each rendezvous, or the obligation upon the jut can be limited to partial withdrawal by fashioning the sweeper as a jut-like component, and withdrawing part of the sweeper in a reciprocating manner, at each rendezvous, into a break in the section of the chamber walls that is incorporated by the engine component that supports the sweeper. The various means of activating the jut and/or the sweeper include allowing the jut and the sweeper to come into direct contact between themselves as they pass one another, shaping a surface of one of them as a cam surface, and having the other of them move in the manner of a cam follower during the passing; figures 11 through 17 may be regarded as illustrating such sweeper-jut interaction.

When a cam surface outside the toroidal chamber is employed in various embodiments of the invention to regulate the functioning of a jut, a fuel injector, an inlet valve, and/or a sweeper, then a cam follower is also employed and is supported by a stationary surface if the cam surface is built onto and/or into a rotating surface; and a cam follower is employed and is supported by a rotating surface if the cam surface is built onto and/or into a stationary surface. With reference to the toroid axis, the point of support of the cam follower and the angular orientation of an appropriate modulation in the cam surface are set so that the cam follower and the modulation interact during the precise phase of rotation when response is called for in a jut, a fuel injector, an inlet valve, and/or a sweeper. The cam follower may be restored to its neutral position by the force of a spring. Any of the many common, standard, well-known, regularly implemented mechanical and/or hydraulic devices can be used to translate the motion of the cam follower into the motion or action of a responding component: for instance, the cam follower can be directly attached to, or even be part of, a jut; or the cam follower can be linked to a jut through an intervening rocker arm, the rocker arm being supported by the engine component which supports the cam follower; or the cam follower, in the manner of a piston, can directly push hydraulic fluid that is contained within a sheathing an end of which is affixed to the engine component which supports the cam follower, while this hydraulic fluid, in turn, pushes an extension of the jut which is in the form of a piston and which slides within an end of the sheathing, the latter end being affixed to the engine component which supports the jut. A valve gate may be made to open or close, or a piston within a fuel injector may be pushed or pulled, in a similar manner.

It may be desirable, in some embodiments of the invention, to heat inducted air not only at the start of operation, as discussed above, but during normal running as well. Temperature of the fresh air pumped into the chamber can be raised, to further assure instantaneous ignition of injected fuel, by bringing the inlet duct into intimate juxtaposition with the exhaust duct and thereby permitting heat transfer between the exiting and the incoming gases.

Figure 24:
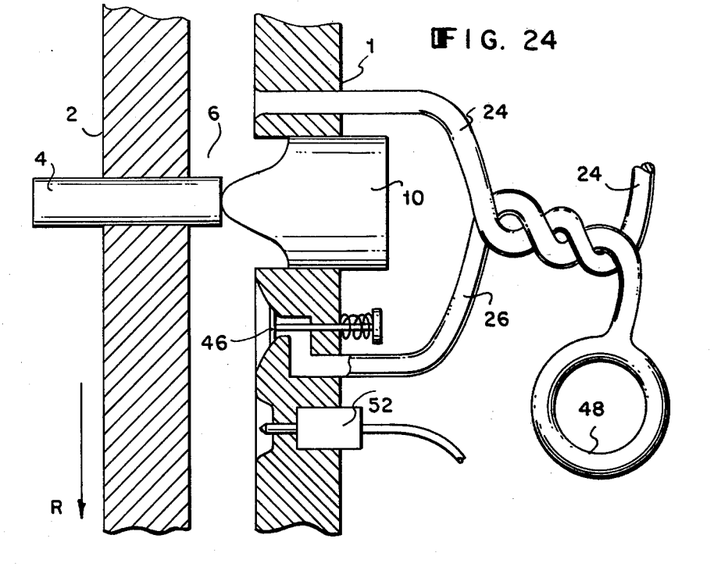
FIG. 24 is a schematic top plan view of the air input, fuel input, and exhaust systems of an assembled engine.
Figure 25:
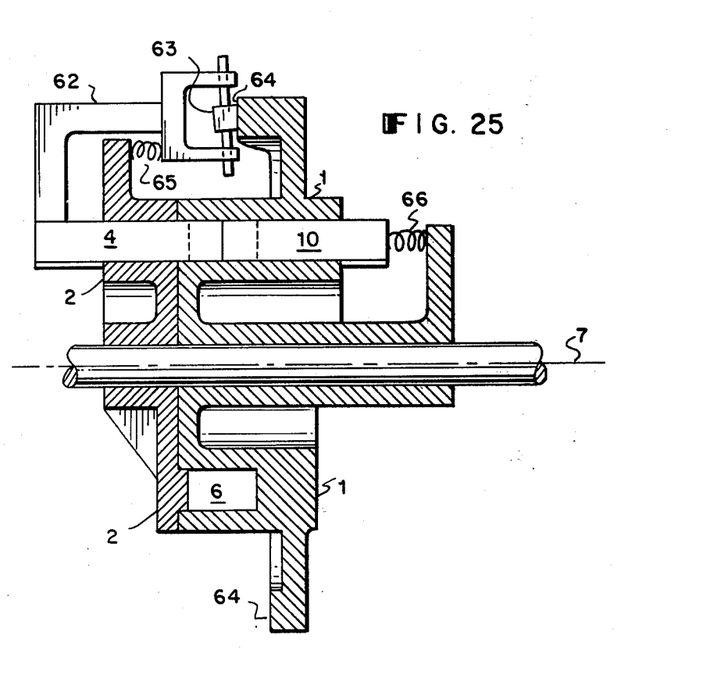
FIG. 25 is a right side elevation view of the engine depicted in FIG. 24.

FIG. 24 and FIG. 25 illustrate an embodiment of the engine in which the reciprocating jut 4 is directly supported by the rotor 2. The jut 4 is shown during its encounter with sweeper 10, which is directly supported by engine block 1. Jut 4 is activated by a cam surface 64 which is fashioned around the perimeter of engine block 1, activation being through the intervention of a cam follower 62 which is rigidly affixed to jut 4. A conical roller, 63, which is supported by cam follower 62, maintains continuous contact with cam surface 64.

During jut-sweeper rendezvous, jut 4 and sweeper 10 of FIGS. 24 and 25 come into and maintain contact with one another. In order to limit the distance of travel of jut 4 and to make it unnecessary for jut 4 to withdraw completely from toroidal chamber 6, sweeper 10 is not rigidly affixed to engine block 1, as it may be in some embodiments, but rather sweeper 10 is mounted in engine block 1 with the freedom to translate parallel with the toroid axis 7. When the revolving jut 4 contacts sweeper 10, part of sweeper 10 is forced out of the chamber 6 allowing the sweeper and the jut to pass one another, with the sweeper moving in the manner of a cam follower. Spring 65 returns jut 4 to the chamber, and spring 66 returns sweeper 10 to the chamber. Sweeper 10, in other embodiments, may be activated by any of the various means by which my reciprocating juts are activated.

FIG. 24 schematically illustrates a means by which inducted air may be pre-heated to assure that temperature in the chamber 6 is sufficiently high to cause self-ignition of fuel the instant fuel injector 52 begins injecting. The exhaust duct 24 is intertwined with inlet duct 26, permitting a transfer of heat from the spent gases, which exit from chamber 6, to the fresh air travelling from air pump 48 past inlet valve 46 to the chamber 6. Inlet valve 46 is shown in the closed position, which it continues to occupy until after jut 4 completes the rendezvous with sweeper 10 and passes the inlet valve.

In the same way that fuel can be burned between a pair of separating obstacles in my engine, fuel can be burned between two or more pairs of separating obstacles. In many embodiments of the engine, during rendezvous of any two obstacles, all obstacles are paired and in rendezvous, and one obstacle of each pair of obstacles is always a reciprocating jut. All juts are directly supported by the engine block, or else all juts are directly supported by the rotor, and the corresponding sweepers, equal in number to the juts, are all directly supported by the engine block if the juts are on the rotor, whereas the sweepers are all directly supported by the rotor if the juts are on the engine block. In an assembled multi-jut embodiment of the engine, the juts are equally spaced around the circumference of the toroidal chamber, and the sweepers are equally spaced around the circumference of the toroidal chamber: thus, for instance, a three-jut embodiment has the juts spaced 120 degrees apart and the sweepers spaced 120 degrees apart. Each region of the chamber that grows between a pair of obstacles as they separate is connected with a fresh-air inlet duct, and is pierced by a fuel injector; each region of the chamber that shrinks between a pair of obstacles as they approach is connected with an exhaust duct; thus, for instance, a three-jut embodiment has at least three inlet ducts, three fuel injectors, and three exhaust ducts. There are as many distinct fuel-burning periods through the course of a single revolution of the rotor as there are juts in my engine. During every burning, any given revolving obstacle sweeps in front of it and out an exhaust duct those products of combustion which, during the previous burning, pushed the revolving obstacle that travels immediately ahead of the given obstacle.

Figure 1:
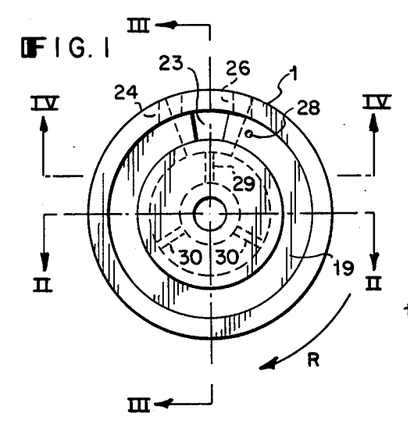
FIG. 1 is an elevation of the front of the engine block of one embodiment of the invention.
Figure 2:
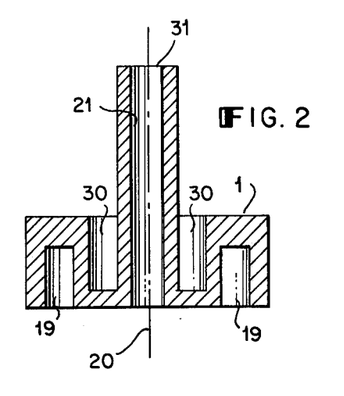
FIG. 2 is a top plan view of this engine block, drawn as a section of the line II—II of FIG. 1.
Figure 3:
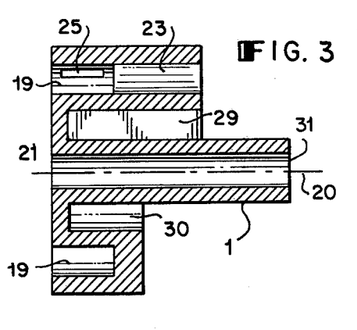
FIG. 3 is a right side elevation view of this engine block, drawn as a section of the line III—III of FIG. 1.
Figure 4:
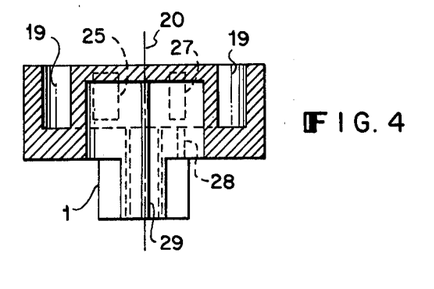
FIG. 4 is a bottom plan view of this engine block, drawn as a section of the line IV—IV of FIG. 1.
Figures 26, 27:
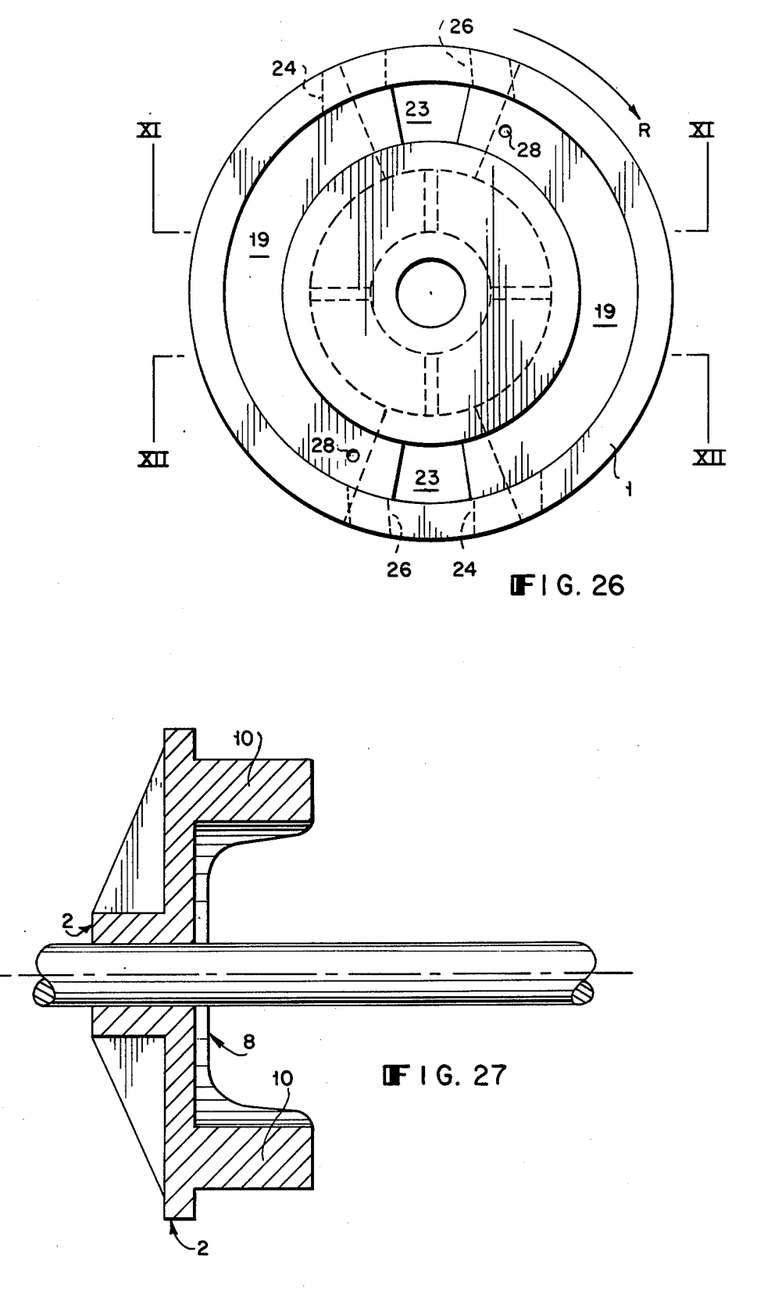
FIG. 26 is an elevation of the front of the engine block of still another embodiment of the invention.
FIG. 27 is a right side elevation view of the rotor which mates with the engine block of FIG. 26.

Components of a two-jut embodiment of the engine are shown in FIGS. 26 and 27. FIG. 26, analogous to FIG. 1, is a front elevation view of an engine block, 1; FIG. 27, analogous to FIG. 6, is a right side elevation view of the rotor, 2, which mates with this engine block, and which rotates in the indicated direction R. The engine blocks of FIG. 1 and FIG. 26 differ only in that (1) the jut cavity 23, exhaust duct 24, inlet duct 26, and injector hole 28 which enter toroidal cavity 19 of FIG. 1, are duplicated in diametrically opposite positions in FIG. 26, and in that (2) the structural ribs, 29 and 30 of FIG. 1, are somewhat re-arranged in FIG. 26. Likewise, the rotors of FIG. 6 and FIG. 27 differ only in that the rotor of FIG. 27 carries two sweepers, 10, on toroidal surface 8. FIG. 4 may be regarded as both a bottom plan view of the engine block of FIG. 26, drawn as a section of the line XI—XI, and also FIG. 4 may be regarded as a top plan view of the engine block of FIG. 26, drawn as a section of the line XII—XII. FIGS. 7 and 5 may be regarded as in part showing top and elevation views, respectively, of the rotor of FIG. 27. And FIGS. 8, 9, and 10 may be regarded as illustrating both of the identical juts which are housed in the two jut cavities, 23, of the engine block of FIG. 26.

The engine examined in FIGS. 26 and 27 operates via essentially the same power-generating process expounded earlier. The sequence of events — waste evacuation, jut reciprocation, air charging, and fuel injection — as a revolving obstacle approaches, passes by, and departs from each non-revolving obstacle in a multi-jut embodiment, is identical with that sequence which transpires as a revolving obstacle approaches, passes by, and departs from a non-revolving obstacle in a single-jut embodiment of the invention.

An inherent advantage of multi-jut embodiments is that their symmetry invites virtually perfect dynamic balance for their rotors.

It is desirable, in many embodiments of my invention, to retract a jut from the toroid and extend a jut back into the toroid as quickly as possible in order to (1) maximize the evacuation of spent gases, and (2) maximize the portion of each revolution during which a revolving obstacle is gas-propelled. With this objective in mind, the rapid withdrawal and re-entry of the jut, in many embodiments of my engine, is executed by mechanisms located outside of the combustion chamber rather than by mechanisms located inside the chamber — that is, the jut is pulled rather than pushed out of the chamber — because conditions inside the chamber militate against the use of elements such as low-friction conical rollers which are ideally suited to the smooth implementation of the jut's required movements.

Air can be introduced to the toroidal chamber to support the combustion of fuel within the chamber, but other combustion-supporting fluids, differing in composition from air, may substitute for air and be similarly introduced.

Continuous fuel injection during the power phase of operation of my engine offers great advantages over an alternative method of spark-ignition of a combustible gas mixture in other engines configured without separate, discrete subsystems for delivering fuel at one time, and combustion-supporting fluid at a different time. One of the positive attributes of my engine is the opportunity it affords for constant-torque output during the power phase, owing to the constant moment-arm, or constant distance between the driven face of the revolving obstacle and the axis about which rotation takes place. Spark ignition, in which an explosion is set off at the beginning of the power phase, fails to profit from the constant moment-arm and results in continuously decreasing torque output throughout the power phase because pressure within the entrapped driving gases continuously decreases as the sweeper and the jut depart from one another. These pressure decreases and consequent torque decreases occur precisely when torque requirements can be expected to increase, since the air pump, during the final portion of the power phase, must be doing maximum work to prepare itself to deliver high-pressure air for the commencement of the succeeding power phase.

An explosion also sharply increases entropy of the working fluid, and can thus be expected to decrease the percentage of total thermal energy which is theoretically recoverable in mechanical form. In fact, unnecessary and efficiency-robbing thermodynamic irreversibilities enter the spark-fired power-generating process during the entire period when pressure of the live gases is elevated above the threshold pressure necessary to do work, during which period the driven surface is forced to accelerate.

On the other hand, when fuel is introduced after the close of introduction of combustion-supporting fluid, the rate of fuel input can easily be controlled to enable the products of combustion to maintain pressure levels around the cycle which yield not only a constant net torque output, but pressure levels which have at all times enough of an increment above or below a nominal mean to exactly meet the varying torque requirements of the pump and other engine accessories.

If, for instance, a single Toroid Sweep Engine is fashioned to yield constant net torque throughout 75 percent of each revolution, and zero net torque throughout the remaining 25 percent of each revolution, then four such engines, ganged along the same drive shaft with 90-degree phase displacements between them, can yield — as a group — unvarying torque and disruptionless power. In pronounced contrast with the output of spark-ignition machines, the drive shaft of a group-engine of the aforesaid type can exhibit virtually no flutter even at very low speed, and can operate with no flywheel.

The embodiments of the invention in which an exclusive property or privilege is claimed are defined as follows:

1. A process for converting latent heat of combustion of fuel into mechanical power, whereby fuel is burned between two obstacles inside a toroidal-shaped chamber, the walls of the chamber being partitioned into at least two ring-like sections which individually encompass the straight-line toroid axis and which rotate relative to one another in a single direction around the toroid axis, two of the ring-like wall sections each supporting a different one of the said obstacles, one of the said two ring-like wall sections transmitting, during combustion of the fuel, power from the said obstacle which that wall section supports, the obstacles being enabled to pass each other during obstacle rendezvous by virtue of the temporary retraction of one of the said obstacles from the toroidal chamber through a cavity in the wall section supporting said obstacle, a pull on said retractable obstacle from outside of the toroidal chamber drawing said retractable obstacle from the toroidal chamber at the beginning of obstacle rendezvous, all geometric circles which are both (1) contained in the interior of the toroidal chamber, and (2) centered on the toroid axis, being interrupted by each of the two said obstacles substantially during all periods except during obstacle rendezvous, the said process including the following sequence of events:

(a) hot air, at a temperature above the self-ignition temperature of the fuel, is induced into the enlarging portion of toroidal chamber space lying between the two obstacles after obstacle rendezvous;

(b) air induction is closed off;

(c) substantially after the close of air induction, a measure of fuel is injected into the air charge that is already within the toroidal chamber, and burns, the products of combustion generating pressure in the injected space and forcing the obstacles to separate from one another, the period of injection of fuel being longer than the period of induction of hot air;

(d) fuel injection is closed off;

(e) the obstacles rendezvous: a pull from outside of the toroidal chamber impels one of the said obstacles to retract from the toroidal chamber through a cavity in the wall section which supports said retractable obstacle, said retraction being of sufficient displacement and duration to allow the other of the said obstacles to pass by;

(f) at the end of obstacle rendezvous the retractable obstacle is impelled to return to the toroidal chamber, resuming interruption of all said geometric circles;

(g) events (a), (b), (c), and (d) repeat;
(h) the obstacles, as they approach one another, sweep and squeeze spent gases out of the diminishing portion of toroidal chamber space lying between the two obstacles;
(i) events (e), (f), (a), (b), (c), (d), and (h) repeat themselves cyclically.

2. A process of energy conversion as defined in claim 1 in which the rate of fuel injection is controlled so as to give rise to and maintain essentially constant pressure against the revolving obstacle during the period of fuel injection.

3. A rotary internal-combustion engine comprising:
(a) a chamber in the form of a toroid, defined between a rotatable body and a stationary body;
(b) a sweeper supported by one of the said bodies defining the toroid, the sweeper adapted to reside within the toroid during a phase of operation, interrupting during said phase every geometric circle which is both contained in the interior of the toroid and centered on the toroid axis;
(c) a jut supported by the other of the said bodies defining the toroid, adapted (1) to reside within the toroid during the said phase of operation interrupting every geometric circle which is both contained in the interior of the toroid and centered on the toroid axis, and also adapted (2) to periodically withdraw at least partially from the toroid through a cavity in the toroid walls sufficiently to enable the sweeper and the jut to pass by one another, the jut in the phase of maximum withdrawal ceasing to interrupt every geometric circle which during the phase of maximum withdrawal is both interrupted by the sweeper and centered on the toroid axis, the jut being adapted to withdraw from the toroidal chamber in response to a pull on the jut from outside of the toroidal chamber;
(d) an exhaust duct communicating with the toroidal chamber in the diminishing region that lies between the sweeper and the jut as the sweeper and the jut approach one another;
(e) an air inlet duct communicating with the toroidal chamber in the enlarging region that lies between the sweeper and the jut as the sweeper and the jut depart from one another;
(f) a hot-air source communicating with the toroidal chamber by way of the air inlet duct, adapted to induce hot air into the enlarging region of the toroidal chamber substantially at the beginning of the said operating phase during which the sweeper and the jut each interrupt every geometric circle that is both contained in the interior of the toroid and centered on the toroid axis, said hot air being of a temperature above the self-ignition temperature of the fuel which the engine is adapted to burn;
(g) means for limiting flow between said hot-air source and the toroidal chamber, the flow-limiting means being adapted to permit induction of hot air into the toroidal chamber only while a point on the rotatable body is oriented within a first sweep of angles relative to the stationary body;
(h) a fuel-delivery means communicating with the toroidal chamber in the enlarging region that lies between the sweeper and the jut as the sweeper and the jut depart from one another, adapted (1) to maintain a feed of fuel directly into the enlarging region of the toroidal chamber subsequent to the induction of hot air into said enlarging region and while the said flow-limiting means is closed, and adapted (2) to maintain a feed of fuel into the toroidal chamber whenever a point on the rotatable body is oriented within a second sweep of angles relative to the stationary body, said second sweep of angles being greater than said first sweep of angles.

4. A rotary internal-combustion engine as defined in claim 3 in which a wall of the toroidal chamber which is part of the rotatable body is substantially perpendicular to the toroid axis.

5. A rotary internal-combustion engine as defined in claim 3 in which the jut is supported by the stationary body and is adapted to move inward to and outward from the toroidal chamber with a reciprocating motion, said reciprocating motion being in a direction substantially parallel with the toroid axis.

6. A rotary internal-combustion engine as defined in claim 3 in which
(a) a cam surface is fashioned on the rotatable body outside of the toroidal chamber;
(b) said cam surface is adapted to impel the jut to withdraw at least partially from the toroidal chamber synchronously with the passage of the sweeper.

7. A rotary internal-combustion engine as defined in claim 3 in which the leading surface of the sweeper geometrically coincides with an array of straight lines all of which pass through the toroid axis, said array being contoured such that a curve which is substantially sinusoidal is formed at the intersection between the array and any right-circular cylindric surface centered on the toroid axis.

8. A rotary internal combustion engine as defined in claim 3 in which the sweeper is adapted to cease interrupting, during the said phase of maximum withdrawal of the jut, at least some of the geometric circles which are both contained in the interior of the toroid and centered on the toroid axis.

9. A rotary internal-combustion engine as defined in claim 3 in which
(a) the jut is a rotatable disc fashioned with a gap at the disc perimeter;
(b) the center of the disc is outside of the toroidal chamber;
(c) the said gap is adapted to enter the toroidal chamber synchronously with the passage of the sweeper.

10. A rotary internal combustion engine as defined in claim 3 in which a multiplicity of sweepers are supported within the toroidal chamber by the body which supports the said sweeper, all of the sweepers being arrayed symmetrically around the toroidal chamber.

11. A rotary internal combustion engine as defined in claim 3 in which a multiplicity of juts are supported within the toroidal chamber by the body which supports the said jut, all of the juts being arrayed symmetrically around the toroidal chamber, and all of the juts being adapted to undergo substantially the same motion as the said jut.

12. A rotary internal combustion engine as defined in claim 3 in which the exhaust duct and the air inlet duct are intertwined so as to permit heat transfer from fluid in the exhaust duct to fluid in the air inlet duct.

* * * * *